US011961495B2

(12) United States Patent
Jackson

(10) Patent No.: US 11,961,495 B2
(45) Date of Patent: Apr. 16, 2024

(54) PIVOT BRIDGE OR PLATE FOR STRINGED MUSICAL INSTRUMENTS AND RELATED METHODS

(71) Applicant: David H. Jackson, Dahlonega, GA (US)

(72) Inventor: David H. Jackson, Dahlonega, GA (US)

( * ) Notice: Subject to any disclaimer, the term of this patent is extended or adjusted under 35 U.S.C. 154(b) by 14 days.

(21) Appl. No.: 17/826,198

(22) Filed: May 27, 2022

(65) Prior Publication Data

US 2023/0410769 A1 Dec. 21, 2023

(51) Int. Cl.
*G10D 3/153* (2020.01)
*G10D 1/08* (2006.01)
*G10D 3/04* (2020.01)

(52) U.S. Cl.
CPC ............... *G10D 1/085* (2013.01); *G10D 3/04* (2013.01)

(58) Field of Classification Search
CPC ................................. G10D 3/153; G10D 3/04
See application file for complete search history.

(56) References Cited

U.S. PATENT DOCUMENTS

| | | | | |
|---|---|---|---|---|
| 4,674,389 A * | 6/1987 | Fender | G10D 3/153 | 84/267 |
| 4,882,967 A * | 11/1989 | Rose | G10D 3/153 | 84/313 |
| 4,955,275 A * | 9/1990 | Gunn | G10D 3/147 | 984/120 |
| 5,429,028 A * | 7/1995 | Fisher, IV | G10D 3/153 | 84/313 |
| 5,672,835 A * | 9/1997 | Doughty | G10D 3/153 | 84/313 |
| 5,808,216 A * | 9/1998 | Fisher, IV | G10D 3/153 | 84/313 |
| 6,867,354 B2 * | 3/2005 | Shimooka | G10D 3/153 | 84/307 |
| 7,045,693 B2 * | 5/2006 | Rose | G10D 1/085 | 84/298 |
| 7,829,773 B2 * | 11/2010 | Shamblin | G10D 3/153 | 84/267 |
| 8,536,431 B1 * | 9/2013 | McCabe | G10D 3/153 | 84/313 |
| 9,029,671 B1 * | 5/2015 | Smith | G10D 3/153 | 84/313 |
| 9,330,637 B1 * | 5/2016 | McCabe | G10D 1/085 | |
| 9,484,007 B1 * | 11/2016 | McCabe | G10D 3/153 | |
| 9,502,010 B1 * | 11/2016 | Cardozo | G10D 3/153 | |
| 9,595,245 B2 * | 3/2017 | McCabe | G10D 3/153 | |
| 9,691,364 B1 * | 6/2017 | McCabe | G10D 3/153 | |
| 9,734,804 B1 * | 8/2017 | McCabe | G10D 3/153 | |
| 9,837,054 B1 * | 12/2017 | McCabe | G10D 1/085 | |
| 9,847,076 B1 * | 12/2017 | McCabe | G10D 1/085 | |
| 10,019,972 B2 * | 7/2018 | Poschelk | G10D 3/153 | |
| 10,157,597 B1 * | 12/2018 | Green | G10D 3/153 | |
| 10,380,977 B1 * | 8/2019 | Rose | G10D 1/085 | |
| 10,580,391 B2 * | 3/2020 | Tobias | G10D 3/153 | |

* cited by examiner

*Primary Examiner* — Robert W Horn
(74) *Attorney, Agent, or Firm* — Buche & Associates, P.C.; Bryce A. Johnson; John. K. Buche

(57) ABSTRACT

Disclosed is an improved pivot or bridge plate that may be constructed originally or may be used to retrofit existing stringed instruments.

6 Claims, 5 Drawing Sheets

PIVOT BRIDGE OR PLATE FOR STRINGED MUSICAL INSTRUMENTS AND RELATED METHODS

CROSS-REFERENCE TO RELATED APPLICATIONS

Not applicable.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

REFERENCE TO AN APPENDIX SUBMITTED ON A COMPACT DISC AND INCORPORATED BY REFERENCE OF THE MATERIAL ON THE COMPACT DISC

Not applicable.

STATEMENT REGARDING PRIOR DISCLOSURES BY THE INVENTOR OR A JOINT INVENTOR

Reserved for a later date, if necessary.

BACKGROUND OF THE INVENTION

Field of Invention

The disclosed subject matter is in the field of pivot or bridge plates for stringed musical instruments.

Background of the Invention

Stringed musical instruments are often equipped with pivot or bridge plates that can be pivoted one way or the other via a lever arm to slacken or tauten the instrument's strings. Such an operation can drop or raise the sound of the strings by a full tone. However, raising or lowering lever arm such devices is not satisfactory in all situations because each string is subject to the same pivoting movement. Accordingly, a need exists for improved devices that can raise or drop the sound of each string by a 1*o* customized pivoting movement.

SUMMARY OF THE INVENTION

Accordingly, it is an object of the present invention to provide an improved pivot or bridge plate.

It is yet another object of the present invention to provide an improved pivot or bridge plate that may be constructed originally or may be used to retrofit existing stringed instruments.

It is yet another object of the present invention to provide an improved pivot or bridge plate that allows a stringed instrument player to have more consistent changes in pitch or fractional changes in tone.

It is yet another object of the present invention to provide an improved pivot or bridge plate that provides customized tuning to each string.

Other objectives of the invention will become apparent to those skilled in the art once the invention has been shown and described. These objectives are not to be construed as limitations of applicant's invention, but are merely aimed to suggest some of the many benefits that may be realized by the apparatus of the present application and with its many embodiments.

BRIEF DESCRIPTION OF THE SEVERAL VIEWS OF THE DRAWINGS

Other objectives of the disclosure will become apparent to those skilled in the art once the invention has been shown and described. The manner in which these objectives and other desirable characteristics can be obtained is explained in the following description and attached figures in which.

Figure 1:
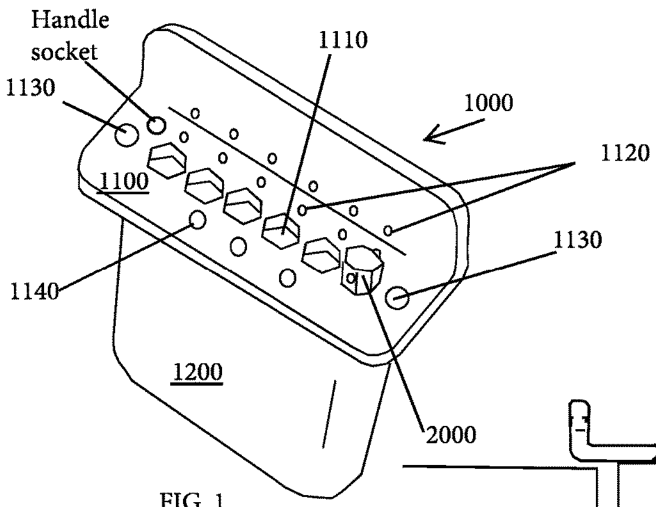
FIG. 1 is a perspective view of pivot plate system.

In the figures, the following reference numerals designate the below identified components:

- Pivot or Bridge Plate Assembly 1000
  - Bridge or pivot plate 1100
    - Cylinder aperture or hole 1110
      - String hole
    - Pivot screw 1130
    - Base screw 1140
  - Base—1200
    - Cylinder aperture or hole 1210
    - Base screw hole 1240
  - Raise tuning stop 1300
  - Open tuning Stop 1400
  - Lower tuning Stop 1500
- String saddle cylinder 2000
  - Saddle cylinder screw 2100
- Musical instrument string 3000
- Roller pressure bar 3100
- Adjustable roller bridge 4000
- String block 5000

It is to be noted, however, that the appended figures illustrate only typical embodiments of this invention and are therefore not to be considered limiting of its scope, for the invention may admit to other equally effective embodiments that will be appreciated by those reasonably skilled in the relevant arts. Also, figures are not necessarily made to scale but are representative.

DETAILED DESCRIPTION OF PROFFERED EMBODIMENTS

Other assembly methods may be practiced depending on the use of alternative embodiments described herein, and will be readily apparent to those skilled in the art.

Figure 2:
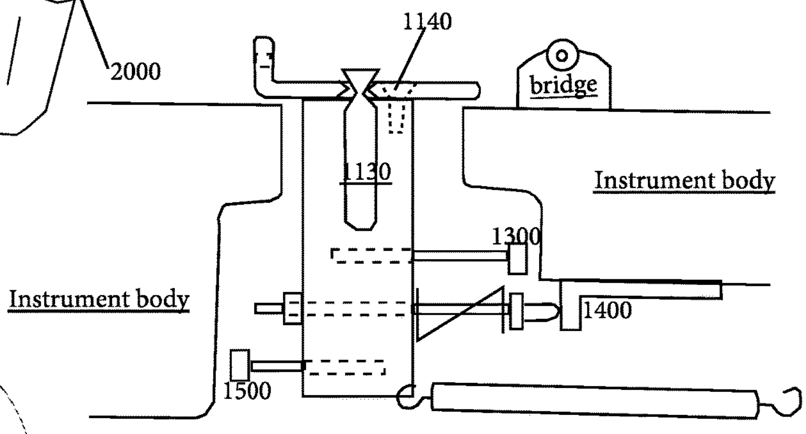
FIG. 2 is cross section of the pivot plate system.

FIG. 1 is a perspective view of pivot plate assembly 1000. FIG. 2 is a cross section of the pivot plate assembly 1000 of FIG. 1. As shown, the assembly 1000 comprises a bridge plate 1100, a base 1200, a raise tuning stop 1300, an open tuning stop 1400, a lower tuning stop, a string saddle 2000, and a string 3000. The base plate 1100 may suitably be defined by a flat piece of rigid material, e.g., metal, with six cylinder apertures 1110, string holes 1120, base screw holes 1140, and pivot screw holes 1130. The base 1200 may be defined by a block with six cylinder holes 1210 (not shown but beneath the cylinder holes 1110), including a set screw hole (not shown) on the bottom of the block, and three base screw holes 1240 (not shown but beneath the base screw holes 1140 of the plate 1100) on the top of the block. The open tuning stop 1400 may be defined by a cylinder attached to a compression spring. The lower tuning stop may be defined by tension springs attached to the base 1200. The string saddle 2000 may be defined by a hexagonal cylinder, a compression spring (not shown), and a set screw 2100.

FIGS. 1 and 2 illustrate the assembly of the pivot plate assembly 1000. As shown, three base screws may be provided to the base screw holes 1140, 1240 to secure the base 1200 to the base plate 1100 in a way that aligns the cylinder holes 1110/1210. The cylinder of the open tuning stop 1300 may be abutted to the instrument body. The raise tuning stop 1300 and lower stop 1500 may be affixed to the base 1200. Finally, the a spring may be provided deep into the cylinder holes 1110/1210, the cylinder 2000 provided on top of the spring (not shown) within the holes 1110/1210, and the set screw 2100 provided through the bottom of the base 1210 so that it couples to the cylinder 2000, through the spring 2010. In practice, the set screw 2100 may be manipulated to raise or lower the cylinder 2000 from the base plate 1100 (i.e., further in and out of the hole 1110). Finally, the whole assembly 1000 may be secured to a musical instrument via pivot screws 1130.

Figure 5:
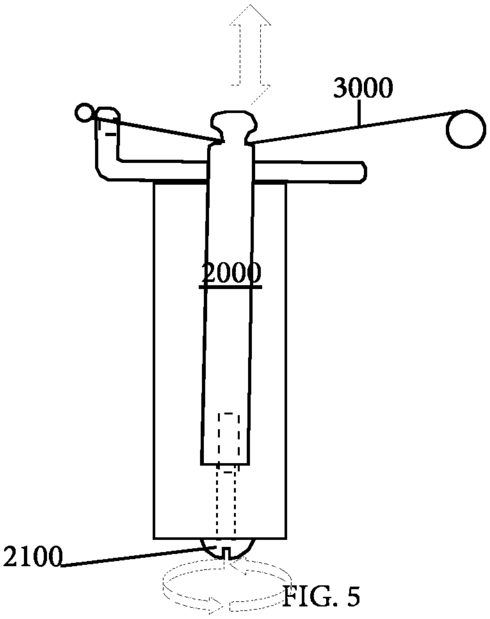
FIG. 5 is another cross section of the pivot plate system.
Figure 6:
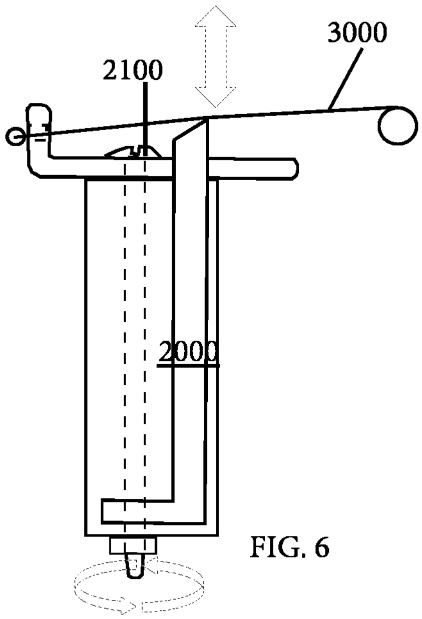
FIG. 6 is another cross section of the pivot plate system.
Figure 7:
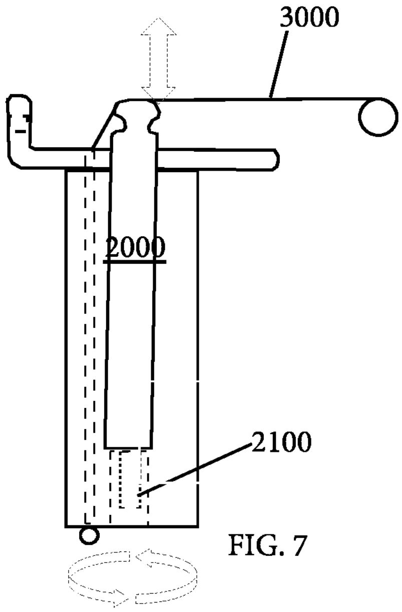
FIG. 7 is another cross section of the pivot plate system.
Figure 8:
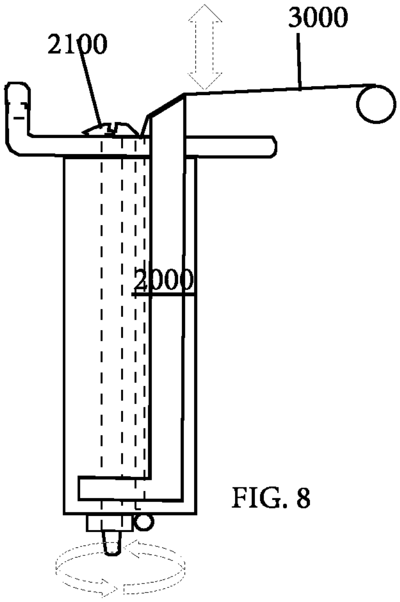
FIG. 8 is another cross section of the pivot plate system.

FIGS. 5 through 8 shows that the cylinder 2000 may be raised or lowered relative to the upper surface of the base plate 1100. As shown, in cross section, the string saddle may be driven up or down via turning of the set screw 2100. When a string 3000 is installed on the saddle 2000, the tune of the string may be manipulated by raising or lowering the saddle 2000 via the set screw 2100. In one embodiment, of FIGS. 6 and 8, the cylinder may have a foot that is connected to a raiser screw. As shown in FIGS. 5 and 6, strings can be provided to the rear string hole of the base plate. As shown in FIGS. 7 and 8, the strings can be threaded through the base 1200 over the top of the cylinder 2000.

Figure 4:
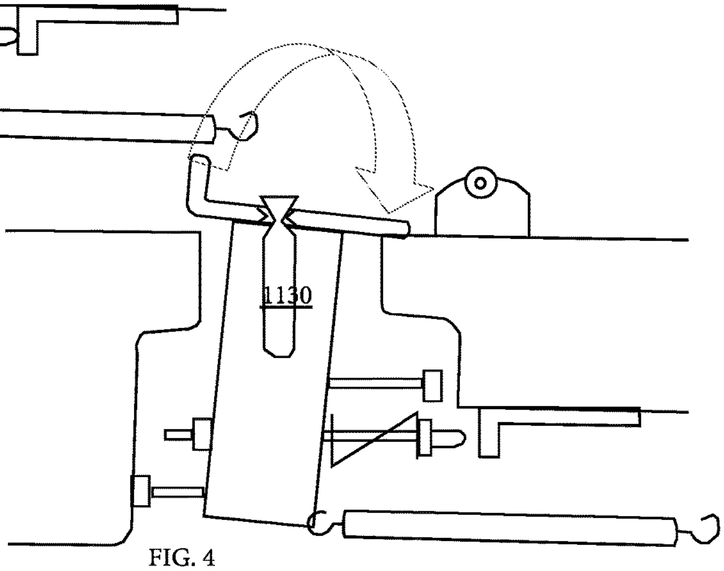
FIG. 4 is another cross section of the pivot plate system.

FIG. 4 illustrates operation of the assembly 1000. A lever bar (not shown) may be secured to the plate 1100. When the lever bar 1150 is pressed downward relative to a neutral position, the assembly 1000 is configured to pivot around said pivot screws 1130 as shown via arrows 4000. Such pivoting action suitably applies a tensile force to the spring of the lower tuning stop 1400 and, when released, the tension will result in the assembly's return to a neutral position via spring force.

Figure 3:
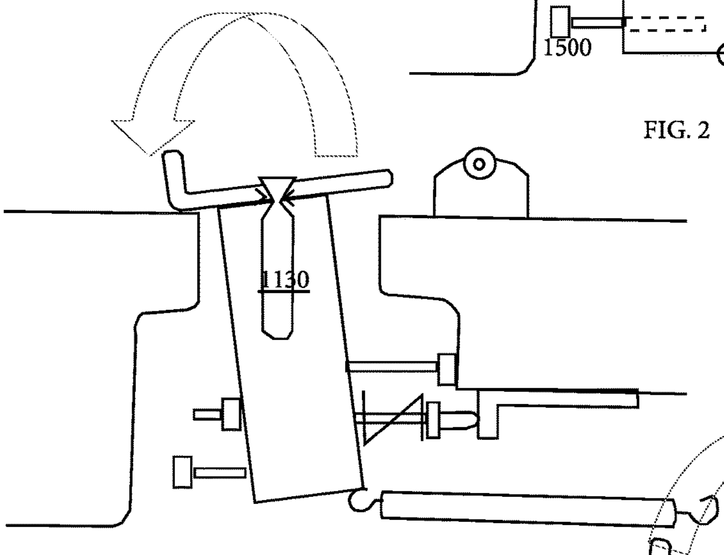
FIG. 3 is another cross section of the pivot plate system.

FIG. 3 illustrates another operation of the assembly 1000. As shown, lever bar 1150 is again secured to the raiser 1120 of the plate 1100. When the lever bar 1150 is pulled upward relative to a neutral position, the assembly 1000 is configured to pivot around said pivot screws as shown via arrows 4000. Such pivoting action suitably applies a compressive force to the spring of the open tuning stop 1400 and, when released, the spring suitably presses the assembly's return to a neutral position via spring force 4100.

Figure 9:
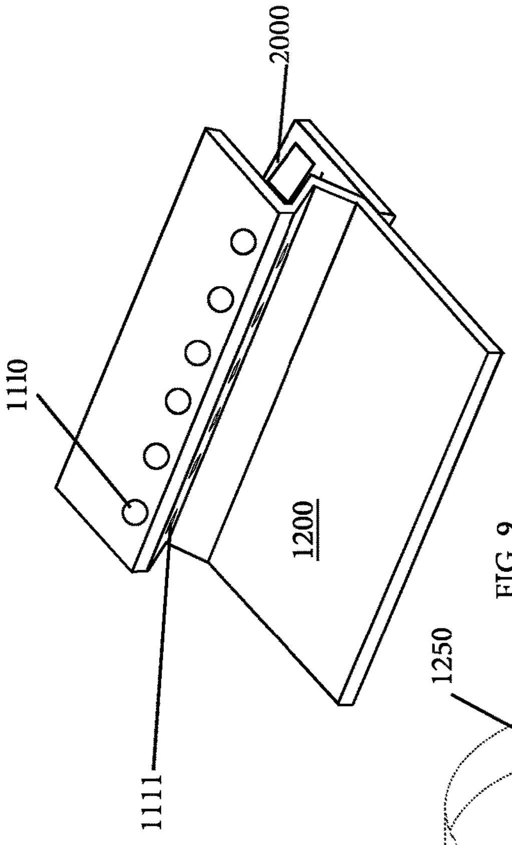
FIG. 9 is a perspective view of pivot plate system.
Figure 10:
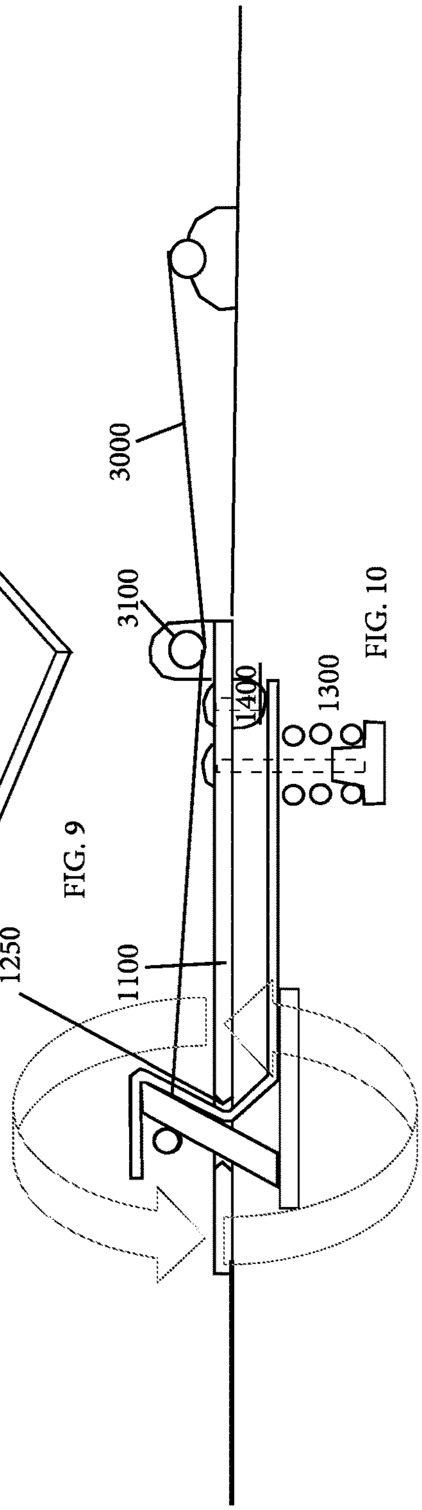
FIG. 10 is cross section of the pivot plate system.
Figure 12:
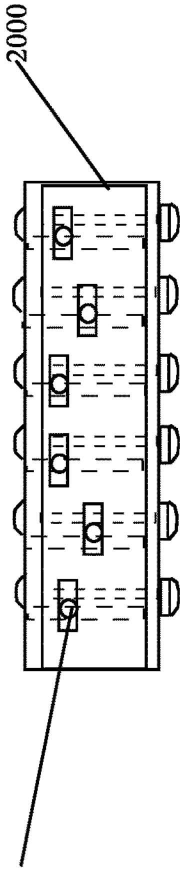
FIG. 12 is a hind view of the pivot plate system.
Figure 11:
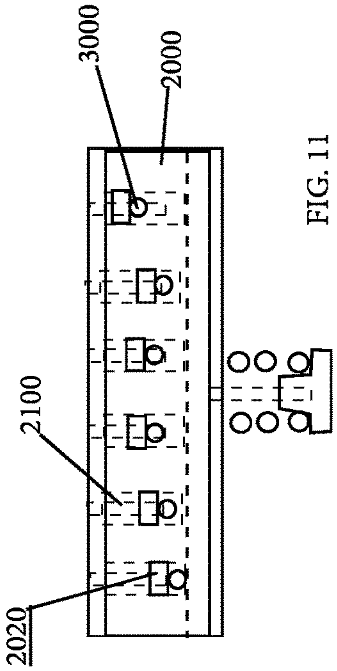
FIG. 11 is hind view of the pivot plate system.

FIG. 9 is a perspective view of another embodiment of a pivot or bridge plate assembly 1000. FIG. 10 shows a cross section of the pivot plate assembly 1000. As shown, the assembly 1000 comprises, like the earlier embodiments of FIGS. 1-4, a bridge plate 1100, a base 1200, a raise tuning stop 1300, an open tuning stop 1400, a string saddle block 2000, and a string 3000 (FIG. 10). The base plate 1100 (shown in FIGS. 9 and 10) may suitably be defined by a flat piece of rigid material, e.g., metal, with an aperture through with the upper portion of the base 1200 may protrude. As shown, the upper portion of the base 1200 includes six cylinder apertures 1110 for access to set screws in the string saddle block 2000 and string slits 1111 through which a string 3000 may be provided for connection to a block 2020 coupled to the set screws 2100. The raise tuning stop 1300 by compression springs is attached to the base 1200. The open tuning stop 1400 may be defined by a nub on the lower surface of the base plate 1100. As shown in FIGS. 11 and 12, the string saddle 2000 may be defined by a plurality of blocks 2020 that may be raised or lowered on a corresponding screw 2100, where the block 2020 has a string channel so the string 3000 may be secured thereto. Suitably, the base plate 1200 may be pivoted around the pivot point 1250 (in the direction of arrows) by raising or lowering a bar or handle (not shown).

As described above in connection with the earlier figures, the block 2020 of the saddle 2000 may be raised or lowered relative to the upper surface of the base 1200. In particular, the block 2020 of the string saddle 2000 may be driven up or down via turning of the set screw 2100. When a string is installed on the block 2020 of the saddle 2000, the tune of the string may be manipulated by raising or lowering the block 2020 of the saddle 2000 via the set screw 2100.

Figure 13:
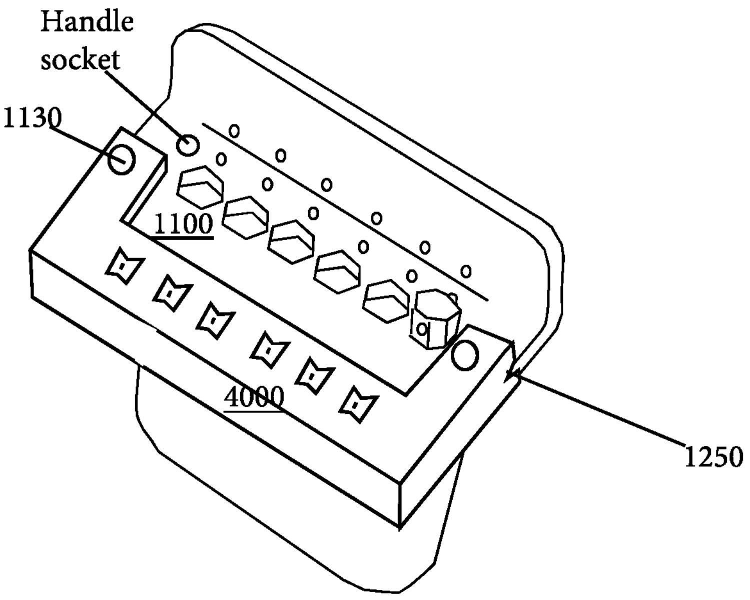
FIG. 13 is a perspective view of pivot plate system.
Figure 14:
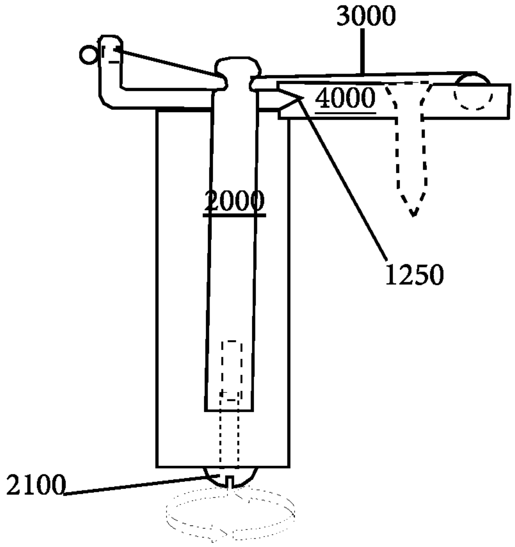
FIG. 14 is another cross section of the pivot plate system.

FIG. 13 is a perspective view of pivot plate assembly 1000 secured to an instrument system via an adjustable roller bridge 4000. FIG. 14 is a cross section of the pivot plate assembly 1000 and adjustable roller bridge 4000 of FIG. 13. As shown, the assembly 1000 comprises a bridge plate 1100 that is provided into a pivoting point 1250 of the roller assembly 4000. As shown, the embodiment of FIGS. 13 and 14 is comparable to the embodiment of FIGS. 1-8. However, unlike the earlier embodiment of FIGS. 1-8, the present embodiment of FIGS. 13 and 14 incorporates an adjustable roller bridge 4000 provides a pivot point 1250 for the pivot plate 1100. In other the adjustable roller bridge 4000 replaces pivot pins (1130, FIG. 1) to incorporate an adjustable saddle 4000 the string 3000.

Figure 15:
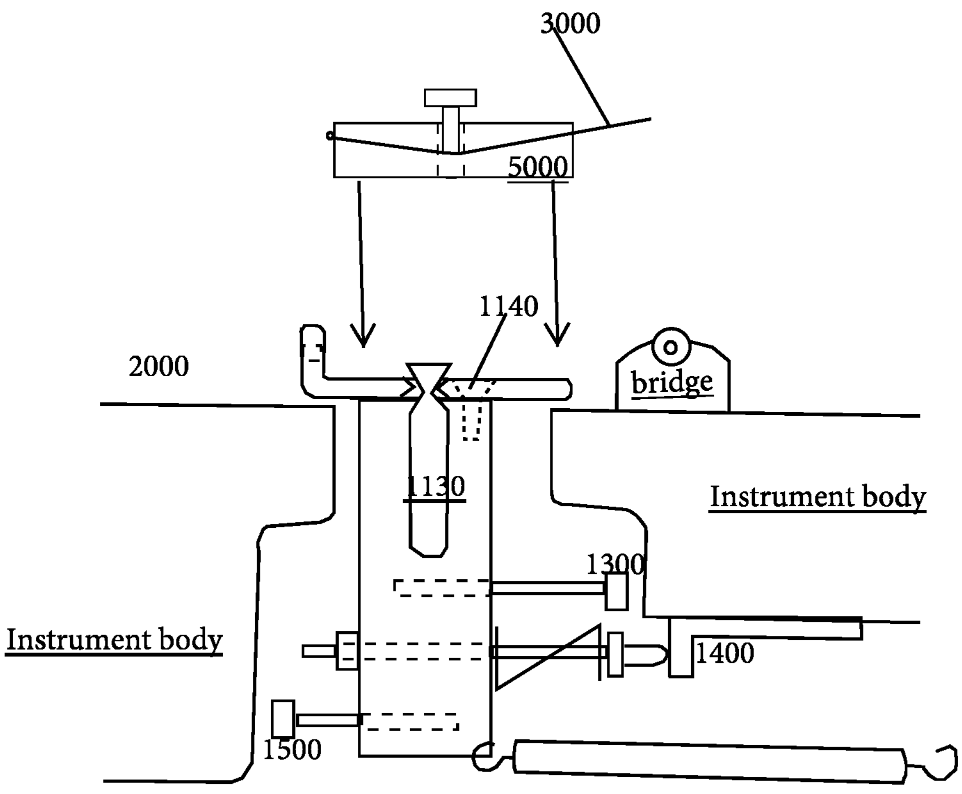
FIG. 15 is yet another cross section of the pivot plate system.

FIG. 15 illustrates the assembly of the pivot plate assembly 1000 and a string block 5000. As shown, the string block 5000 is configured to mount on the pivot plate 1100 and base to provide a tuning cylinder for the string 3000 via knurl nut that can be raised or lowered for top tuning of the string 3000. As before, the embodiment includes several tuning stops within the instrument (see FIGS. 1-8).

Terms and phrases used in this document, and variations thereof, unless otherwise expressly stated, should be construed as open-ended as opposed to limiting. As examples of the foregoing: the term "including" should be read as meaning "including, without limitation" or the like, the term "example" is used to provide exemplary instances of the item in discussion, not an exhaustive or limiting list thereof, the terms "a" or "an" should be read as meaning "at least one," "one or more," or the like, and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that might be available or known now or at any time in the future. Likewise, where this document refers to technologies that would be apparent or known to one of ordinary skill in the art, such technologies encompass those apparent or known to the skilled artisan now or at any time in the future. As described above in connection with the earlier figures, the saddle 2000 may be raised or lowered relative to the upper surface of the base 1200. In particular, the string saddle 2000 may be driven up or down via turning of the set screw 2020. When a string is installed on the saddle 2000, the tune of the string may be manipulated by raising or lowering the saddle 2000 via the set screw 2020.

The presence of broadening words and phrases such as "one or more," "at least," "but not limited to" or other like phrases in some instances shall not be read to mean that the narrower case is intended or required in instances where such broadening phrases might be absent. The use of the term "assembly" does not imply that the components or functionality described or claimed as part of the module are all configured in a common package. Indeed, any or all of the various components of a module, whether control logic or other components, might be combined in a single package or separately maintained and might further be distributed across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives might be implemented without confinement to the illustrated examples. For example, block diagrams and their accompanying description should not be construed as mandating a particular architecture or configuration.

All original claims submitted with this specification are incorporated by reference in their entirety as if fully set forth herein.

I claim:

1. A pivot plate assembly comprising:

a. a pivot plate comprising;

i. a tuning cylinder;

b. a base comprising:

i. a housing with a cavity for the tuning cylinder, said cavity including means for adjusting the position of the tuning cylinder within the cavity so that a string of a musical instrument is raised or lowered relative to the pivot plate when said means are operated;

ii. an open tuning stop;

iii. a raise stop;

iv. a lower stop; and, c. a tremolo arm for pivoting the pivot plate around a pivot point so that the string is slacked or a tautened.

2. The pivot plate assembly of claim 1 wherein said means for adjusting the position of the tuning cylinder provides top or bottom tuning via set screw or knurl nut.

3. The pivot plate assembly of claim 1 wherein said pivot point is defined by a pivot screw.

4. The pivot plate assembly of claim 1 wherein said pivot point is defined by block with a knife edge receptacle.

5. The pivot plate assembly of claim 4 wherein said block includes a bridge for the string.

6. The pivot plate assembly of claim 1 wherein said pivot point is defined by a pivot pin joining the pivot plate and block for joint motion of the pivot plate assembly around said pivot pin.

* * * * *